(12) United States Patent
Persaud

(10) Patent No.: US 12,361,844 B2
(45) Date of Patent: Jul. 15, 2025

(54) TRAILER HITCH MOUNT DISPLAY APPARATUS

(71) Applicant: Kawal Persaud, Sorrento, FL (US)

(72) Inventor: Kawal Persaud, Sorrento, FL (US)

( * ) Notice: Subject to any disclaimer, the term of this patent is extended or adjusted under 35 U.S.C. 154(b) by 267 days.

(21) Appl. No.: 18/318,572

(22) Filed: May 16, 2023

(65) Prior Publication Data
US 2023/0382313 A1 Nov. 30, 2023

Related U.S. Application Data

(63) Continuation-in-part of application No. 29/868,321, filed on Nov. 29, 2022.

(60) Provisional application No. 63/347,443, filed on May 31, 2022.

(51) Int. Cl.
| | | |
|---|---|---|
| *G09F 7/18* | (2006.01) | |
| *B60R 11/00* | (2006.01) | |
| *G09F 21/04* | (2006.01) | |

(52) U.S. Cl.
CPC .............. *G09F 7/18* (2013.01); *G09F 21/048* (2013.01); *B60R 2011/004* (2013.01); *B60R 2011/0052* (2013.01); *B60R 2011/0084* (2013.01); *G09F 2007/1865* (2013.01)

(58) Field of Classification Search
None
See application file for complete search history.

(56) References Cited

U.S. PATENT DOCUMENTS

| | | |
|---|---|---|
| 5,603,178 A | 2/1997 | Morrison |
| 6,412,202 B1 | 7/2002 | Oswood |
| 6,553,697 B1 * | 4/2003 | Pichan .................... G09F 13/04 40/575 |
| 7,503,135 B2 | 3/2009 | Chafin |
| 9,805,632 B2 | 10/2017 | Frost |

\* cited by examiner

*Primary Examiner* — Christopher Braniff

(57) ABSTRACT

A trailer hitch mount display apparatus includes a U-bracket, a sign holder, a hitch pin, at least one ball locking pin, a message-displaying board, and a board locking mechanism. The hitch pin is selectively mounted to a fixed end of the U-bracket as the hitch pin mounts the U-bracket to a vehicle. The sign holder is adjustably mounted to a free end of the U-bracket through the at least one ball locking pin. The message-displaying board and the U-bracket are oppositely positioned of each other. The message-displaying board is slidably engaged to the sign holder. The board locking mechanism is operatively coupled in between the sign holder and the message-displaying board as the board locking mechanism secures the message-displaying board to the sign holder.

20 Claims, 7 Drawing Sheets

TRAILER HITCH MOUNT DISPLAY APPARATUS

The current application is a continuation-in-part (CIP) application of the U.S. design application Ser. No. 29/868,321 filed on Nov. 29, 2022.

The current application also claims a priority to the U.S. provisional patent application Ser. No. 63/347,443 filed on May 31, 2022.

FIELD OF THE INVENTION

The present invention relates generally to a sign holder and a display board. More specifically, the present invention is a trailer hitch mount display apparatus that mounts to a receiver tube of the vehicular trailer hitch so that a message displaying board can be secured within.

BACKGROUND OF THE INVENTION

A trailer hitch is a device that is attached to the chassis of a vehicle for towing. Trailer hitches for conventional passenger cars, light-duty commercial vehicles, light trucks, and multipurpose passenger vehicles can be available as OEM part or aftermarket part so that a receiver-tube of the trailer hitch can accept removable aftermarket hitch-mounted accessories: trailer hitch ball mounts, hitch bike racks, cargo carriers, etc. Typically, the removable hitch-mounted accessories are mount to the receiver-tube through a hitch pin or other similar fasteners. Some vehicle owners, who do not use the trailer hitch for intended purposes, are constantly searching for aftermarket accessories that can cover up the receiver-tube. However, the existing trailer hitch covers generally display an engraved sign that is not changeable. Furthermore, the existing trailer hitch cover does not allow horizontal and vertical adjustments that are critical to installation process as the physical structure of each vehicle is different from one another.

An objective of the present invention is to provide a trailer hitch mount display apparatus that can easily and adjustably mount to the receiver-tube of the trailer hitch. A sign holder of the present invention is mounted to the receiver-tube as an interchangeable sign of the present invention is secured to the sign holder. Furthermore, the present invention allows flexibility to adjust the final positioning of the interchangeable sign vertically and horizontally. Furthermore, the sign holder and the interchangeable sign can be easily mounted, adjusted, or replaced without using any tools.

DETAIL DESCRIPTIONS OF THE INVENTION

All illustrations of the drawings are for the purpose of describing selected versions of the present invention and are not intended to limit the scope of the present invention.

Figure 1:
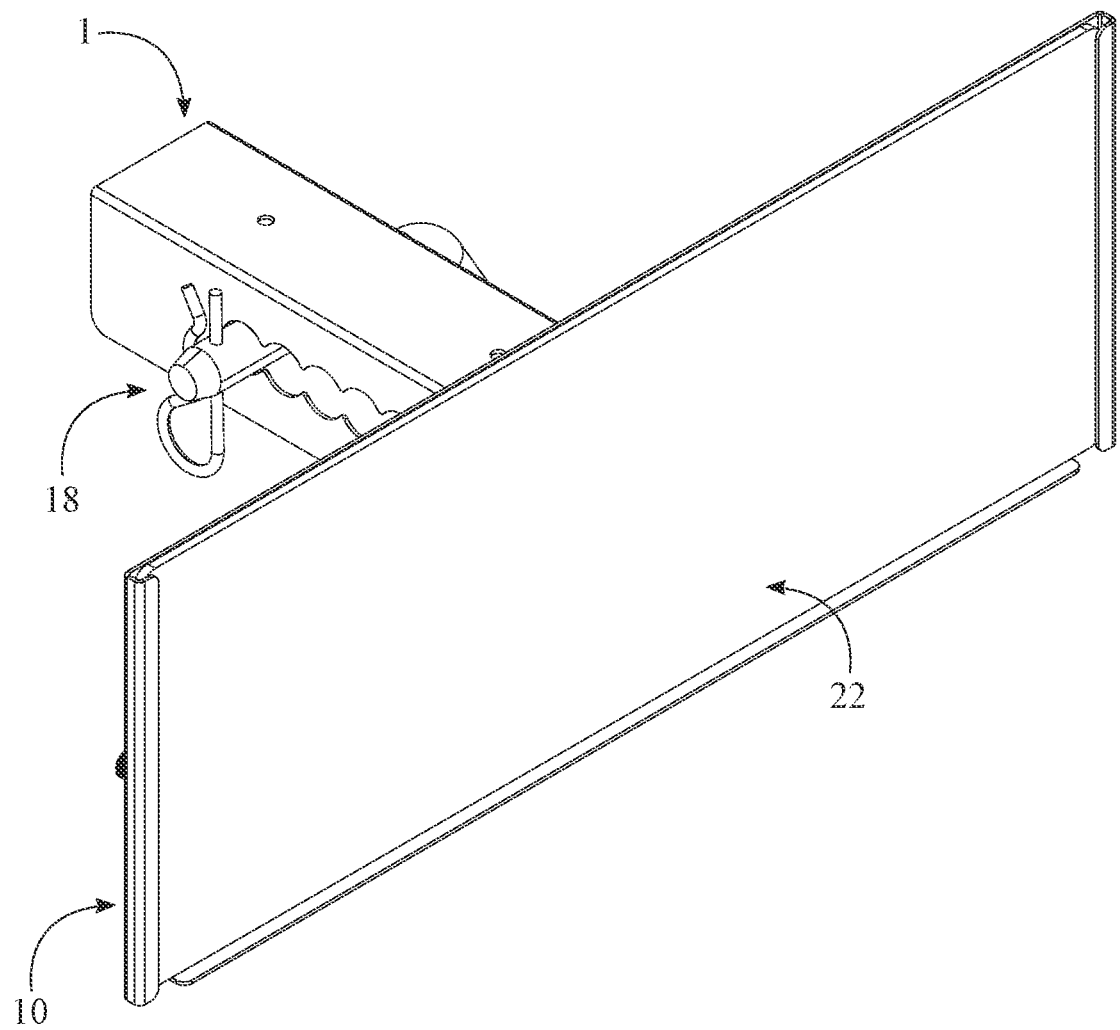
FIG. 1 is a front perspective view of the present invention.
Figure 2:
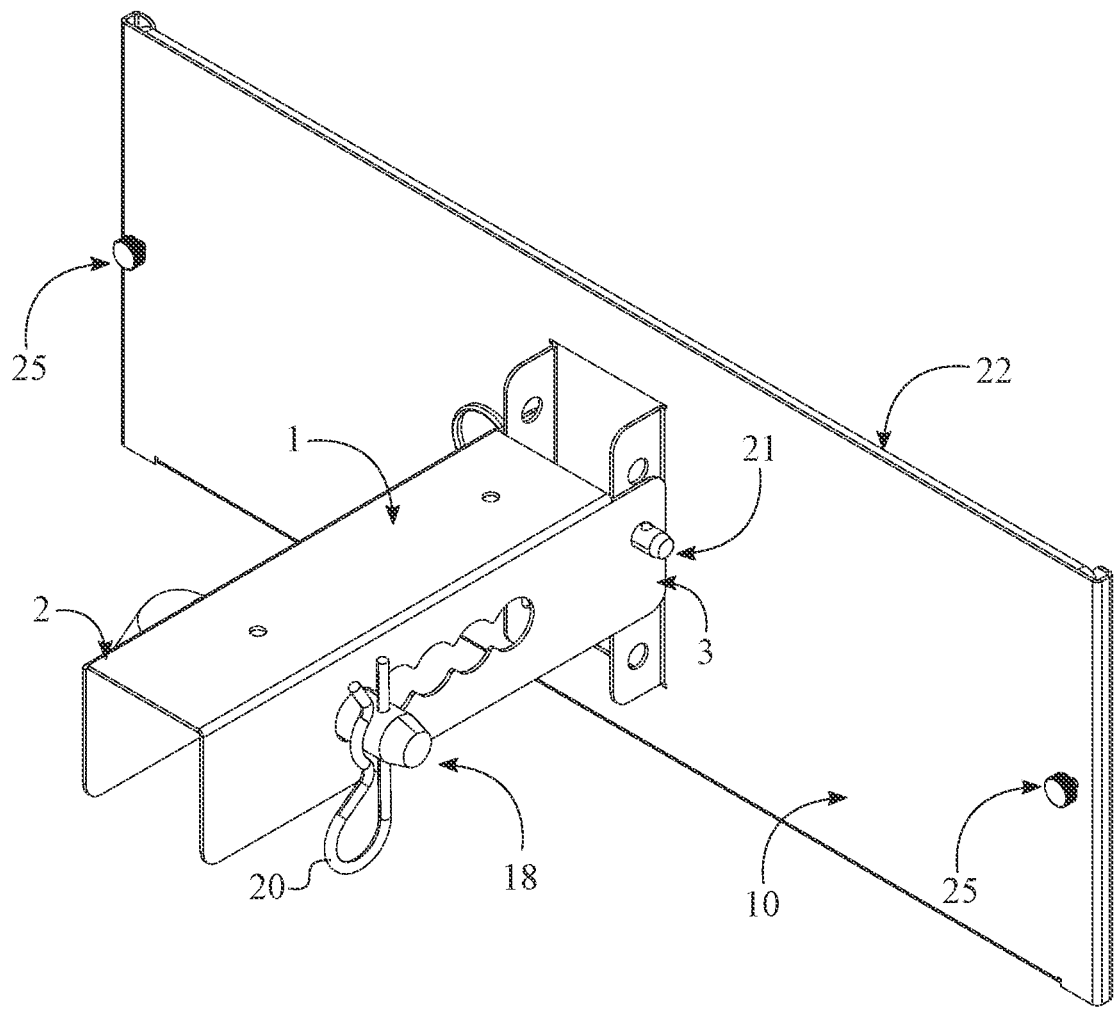
FIG. 2 is a rear perspective view of the present invention.

The present invention is a trailer hitch mount display apparatus that can be mounted onto a trailer hitch of any vehicle. More specifically, the present invention is mounted onto a receiver-tube of the trailer hitch so that the general area of the trailer hitch can be covered with an interactive message or sign. As shown in FIG. 1 and FIG. 2, the present invention comprises a U-bracket 1, a sign holder 10, a hitch pin 18, at least one ball locking pin 21, a message-displaying board 22, and a board locking mechanism 25.

Figure 3:
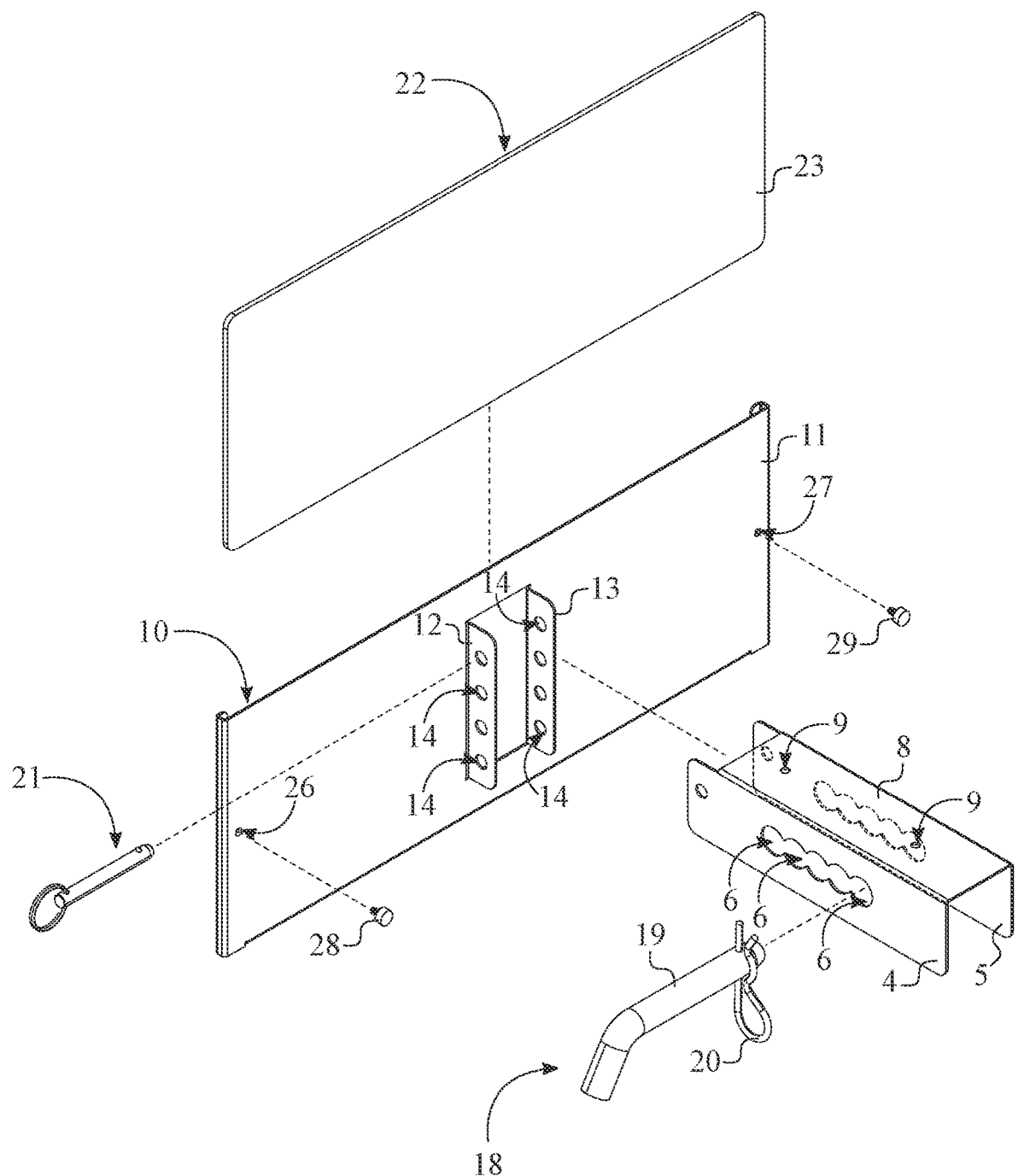
FIG. 3 is a rear exploded view of the present invention.

In reference to the general configuration of the present invention, as shown in FIGS. 1-3, the U-bracket 1 is placed around the receiver-tube so that the hitch pin 18 can selectively mount a fixed end 2 of the U-bracket 1 to the vehicle. Resultantly, a free end 3 of the U-bracket 1 is extended away from the vehicle thus allowing the rest of the components of the present invention to be positioned. The sign holder 10 is adjustably mounted to the free end 3 of the U-bracket 1 through the at least one ball locking pin 21, wherein the user is able to adjust the sign holder 10 vertically and horizontally. The message-displaying board 22 and the U-bracket 1 are positioned opposite of each other so that the message-displaying board 22 can slidably be engaged to the sign holder 10. As a result, the message-displaying is able to demonstrate an interactive message or sign while covering the general area of the trailer hitch. The board locking mechanism 25 is operatively coupled in between the sign holder 10 and the message-displaying board 22 so that user can easily secure the message-displaying board 22 to the sign holder 10 through the board locking mechanism 25.

The U-bracket 1 functions as an extension mounting body so that the sign holder can be positioned clear of any obstructions such as the rear bumper. In reference to FIG. 4 and FIG. 5, the U-bracket 1 may further comprise a first lateral plate 4, a second lateral plate 5, a cross plate 8, a plurality of length-adjustable holes 6, and at least one pin-receiving opening 7. The first lateral plate 4 and the second lateral plate 5 are positioned parallel to each other as the cross plate 8 is positioned in between the first lateral plate 4 and the second lateral plate 5. The first lateral plate 4 is terminally connected to the cross plate 8. The second lateral plate 5 is terminally connected to the cross plate 8, opposite of the first lateral plate 4. For example, when the U-bracket 1 is mounted to the receiver-tube, the cross plate 8 is positioned atop the receiver-tube so that the first lateral plate 4 and the second lateral plate 5 are able to position along the left side and the right side of the receiver-tube. Furthermore, the U-bracket 1 can be mounted in reference to two different orientations thus providing additional vertical adjustments to the sign holder 10. For example, the cross plate 8 can be positioned atop the receiver-tube as the first lateral plate 4 and the second lateral plate 5 are oriented downward. The cross plate 8 can also be positioned below the receiver-tube as the first lateral plate 4 and the second lateral plate 5 are oriented upward. Even though the U-bracket 1 is preferably formed into a U-shaped body within the preferred embodiment, the U-bracket 1 can also be formed into a rectangular tubular body that fits around the receiver-tube.

Figure 4:
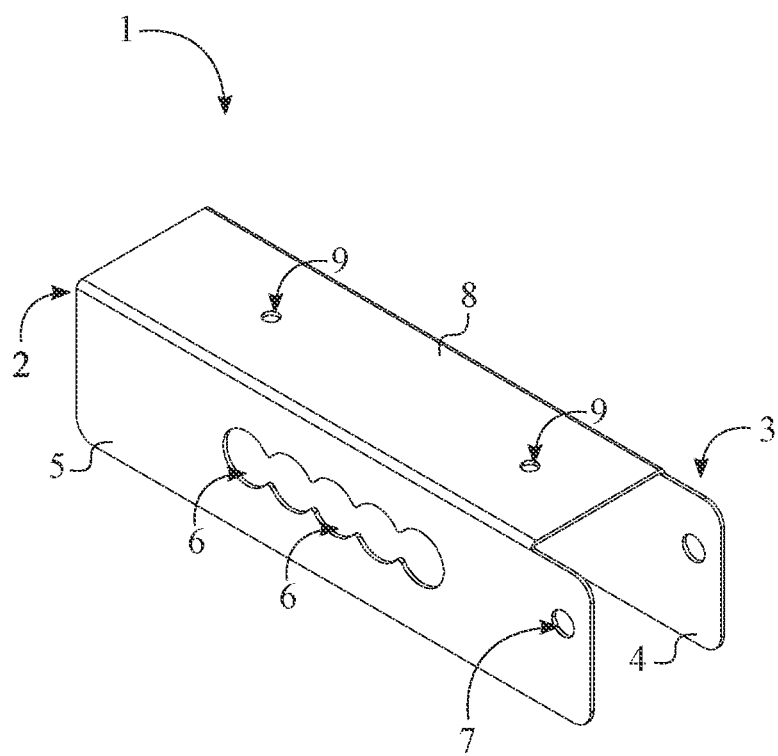
FIG. 4 is a perspective view of the U-bracket of the present invention.
Figure 5:
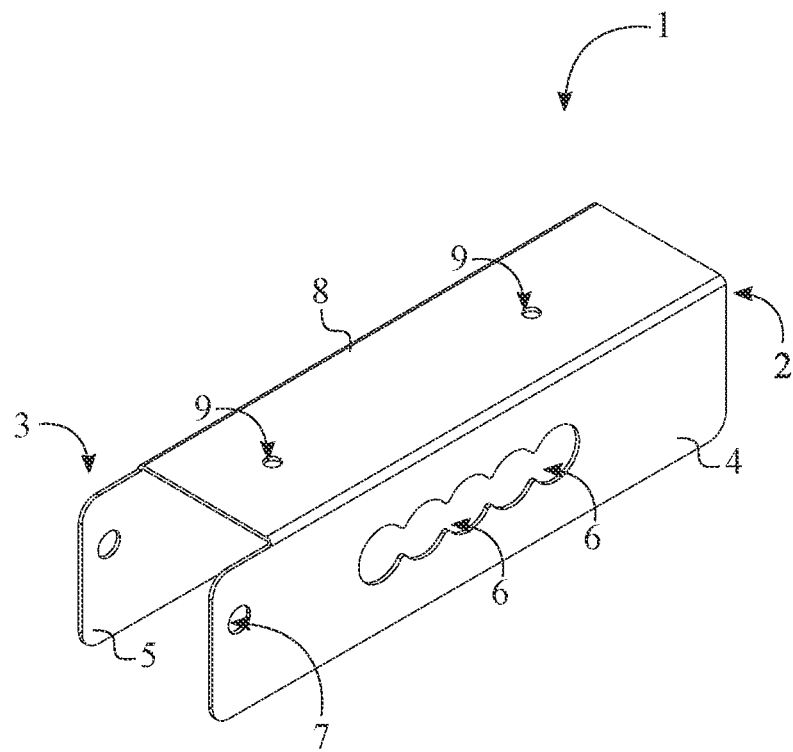
FIG. 5 is a perspective view of the U-bracket of the present invention.

In reference to FIGS. 3-5, the plurality of length-adjustable holes 6 traverses through the first lateral plate 4 and the second lateral plate 5 to accommodate the selective positioning of the hitch pin 18. More specifically, each of the plurality of length-adjustable holes 6 is linearly distributed along the first lateral plate 4 and the second lateral plate 5 and positioned about the fixed end 2. As a result, the user is able to adjust the overall length of the present invention through the plurality of length-adjustable holes 6. For example, when the hitch pin 18 is inserted through one of the plurality of length-adjustable holes 6 that is positioned closer to the free end 3, the sign holder 10 is positioned closer to the vehicle. When the hitch pin 18 is inserted through one of the plurality of length-adjustable holes 6 that is positioned far away from the free end 3, the sign holder 10 is positioned away from to the vehicle.

In reference to FIGS. 3-5, the at least one pin-receiving opening 7 traverses through the first lateral plate 4 and the second lateral plate 5 so that the at least one ball locking pin 21 can engage with the U-bracket 1. More specifically, the at least one pin-receiving opening 7 is positioned offset from the plurality of length-adjustable holes 6 and about the free end 3. Furthermore, when the U-bracket 1 is mounted to the receiver-tube, the at least one pin-receiving opening 7 is positioned offset from the receiver-tube thus allowing the at least one ball locking pin 21 to be inserted without any obstruction.

In reference to FIG. 4 and FIG. 5, the U-bracket 1 may further comprise a plurality of drain holes 9 that traverses through the cross plate 8. The plurality of drain holes 9 enables the drainage of water through the U-bracket 1 to protect the cross plate 8. Even though the preferred embodiment only illustrates two drain holes as the plurality of drain holes 9, the number of drain holes that traverses through the cross plate 8 can differ depending upon the length of the U-bracket 1.

The hitch pin 18 is a quick release fastener that is utilized within the industry so that the user is able to insert and remove the hitch pin 18 without utilizing any tools. In reference to FIGS. 1-3, the hitch pin 18 may comprise a pin body 19 and a locking clip 20. The pin body 19 is slidably engaged within an arbitrary hole of the plurality of length-adjustable holes 6 of the first lateral plate 4 and a corresponding hole of the plurality of length-adjustable holes 6 of the second lateral plate 5 so that the U-bracket 1 can be mounted to the receiver-tube. More specifically, a shaft of the pin body 19 inserted through a selected hole of the plurality of length-adjustable holes 6 of the first lateral plate 4, the existing pin opening of the receiver-tube, and a matching hole of the plurality of length-adjustable holes 6 of the second lateral plate 5 that is positioned directly opposite of the selected hole. Resultantly, a head of the pin body 19 is able positioned against the first lateral plate 4. The locking clip 20 is removably engaged with the pin body 19 and externally positioned to the U-bracket 1 so that the hitch pin 18 is able to attach the U-bracket 1 to the receiver-tube.

Figure 6:
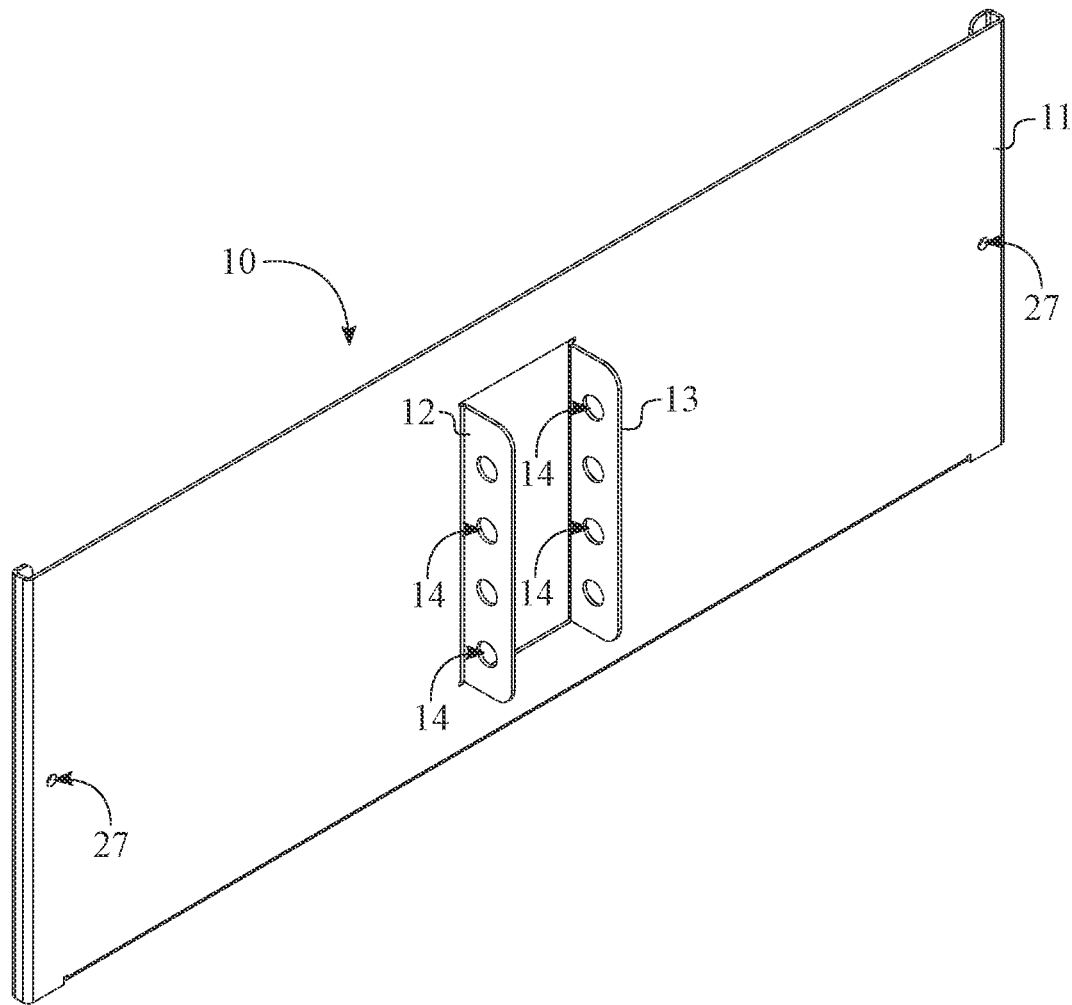
FIG. 6 is a rear view of the sign holder of the present invention.

The sign holder 10 functions as the platform that displays the message-displaying board 22. Furthermore, the configuration of the sign holder 10 allows the user to easily interchange different message-displaying boards 22 without limiting to a single message/sign. In reference to FIG. 3, FIG. 6, and FIG. 7, the sign holder 10 may comprise a back panel 11, a first connecting arm 12, a second connecting arm 13, and a plurality of height-adjustable holes 14. The first connecting arm 12 and the second connecting arm 13 are positioned opposite of each other, wherein the first connecting arm 12 and the second connecting arm 13 are centrally connected to the back panel 11. In other words, the first connecting arm 12 and the second connecting arm 13 are configured in a such a way that the first connecting arm 12 is positioned adjacent to the first lateral plate 4 about the free end 3 and the second connecting arm 13 is positioned adjacent to the second lateral plate 5 about the free end 3. The plurality of height-adjustable holes 14 traverses through the first connecting arm 12 and the second connecting arm 13 as each of the plurality of height-adjustable holes 14 is linearly distributed along the first connecting arm 12 and the second connecting arm 13. More specifically, the plurality of height-adjustable holes 14 linearly distributed from a top edge of the first connecting arm 12 and the second connecting arm 13 to a bottom edge of the first connecting arm 12 and the second connecting arm 13. As a result, the user is able to vertically adjust the positioning of the sign holder 10 with respect to the positioning of the at least one pin-receiving opening 7. Resultantly, the at least one ball locking pin 21 is removably engaged within an arbitrary hole of the plurality of height-adjustable holes 14 of the first connecting arm 12, the at least one pin-receiving opening 7, and a corresponding hole of the plurality of height-adjustable holes 14 of the second connecting arm 13. The at least one ball locking pin 21 is a quick release and self-locking fastener that is utilized within the industry so that the user is able to insert and remove the at least one ball locking pin 21 without utilizing any tools.

Figure 7:
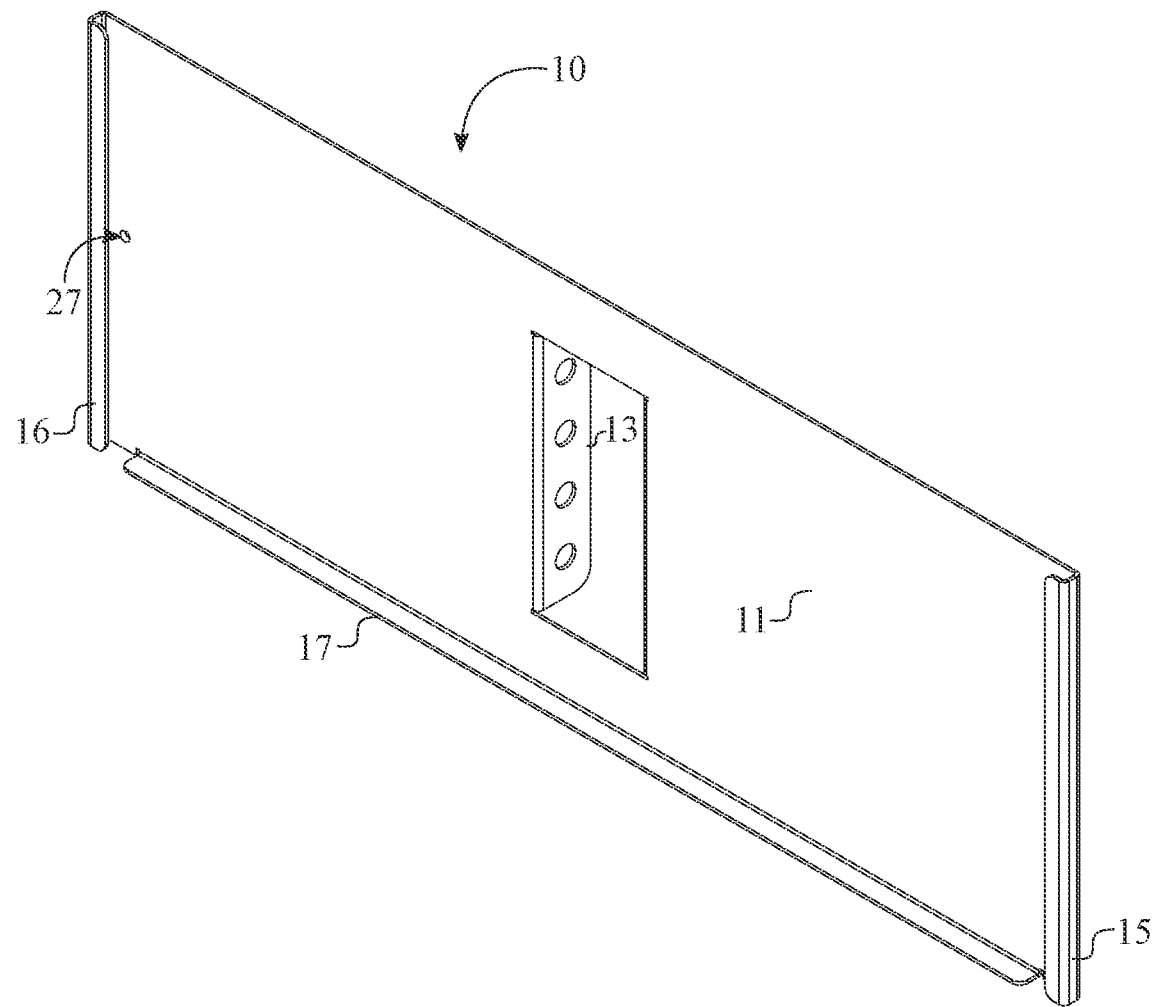
FIG. 7 is a front view of the sign holder of the present invention.

In reference to FIG. 7, the sign holder 10 may further comprise a first lip 15, a second lip 16, and an intermediate lip 17. The first lip 15, the second lip 16, and the intermediate lip 17 are perimetrically connected around the back panel 11 so that the message-displaying board 22 can be positioned against the back panel 11. The first lip 15 is diametrically opposed to the second lip 16 as the intermediate lip 17 is positioned in between the first lip 15 and the second lip 16. Resultantly, the message-displaying board 22 is able to slidably engage within the back panel 11, the first lip 15, the second lip 16, and the intermediate lip 17. For example, when the user inserts the message-displaying board 22 from the top end of the sign holder 10, the left side and the right side of the message-displaying board 22 are supported by the first lip 15 and the second lip 16, and the bottom side of the message-displaying board 22 is supported by the intermediate lip 17. Preferably, the first lip 15, the second lip 16, and the intermediate lip 17 are shaped into a c-channel so that the message-displaying board 22 can be retained about the back panel 11.

The board locking mechanism 25 is a quick release fastener that is utilized within the industry so that the user is able adjust the board locking mechanism 25 without utilizing any tools. In reference to FIGS. 1-3, the board locking mechanism 25 may comprise a first threaded opening 26, a second threaded opening 27, a first thumb screw 28, and a second thumb screw 29. The first threaded opening 26 traverses through the back panel 11 and positioned offset from the first connecting arm 12. The second threaded opening 27 traverses through the back panel 11 and positioned offset from the second connecting arm 13. More specifically, the first threaded opening 26 is positioned adjacent to the first lip 15, and the second threaded opening 27 is positioned adjacent to the second lip 16. The first thumb screw 28 being threadedly engaged to the first threaded opening 26 and a rear surface 23 of the message-displaying board 22. The second thumb screw 29 is threadedly engaged to the second threaded opening 27 and the rear surface 23 of the message-displaying board 22. As result, the first thumb screw 28 and the second thumb screw 29 are able to push the message-displaying board 22 outward and press the message-displaying board 22 against the first lip 15, the second lip 16, and the intermediate lip 17.

Preferably, the interactive message or sign is integrated into a front surface of the message-displaying board 22 so that the interactive message can be visible from behind the vehicle. However, it is also possible that a first interactive message or sign is integrated into the front surface of the message-displaying board 22, and a second interactive message or sign is integrated into the rear surface 23 of the message-displaying board 22.

Although the invention has been explained in relation to its preferred embodiment, it is to be understood that many other possible modifications and variations can be made without departing from the spirit and scope of the invention as hereinafter claimed.

What is claimed is:

1. A trailer hitch mount display apparatus comprising:
a U-bracket;
a sign holder;
a hitch pin;
at least one ball locking pin;
a message-displaying board;
a board locking mechanism;
the hitch pin being selectively mounted to a fixed end of the U-bracket, wherein the hitch pin mounts the U-bracket to a vehicle;
the sign holder being adjustably mounted to a free end of the U-bracket through the at least one ball locking pin;
the message-displaying board and the U-bracket being oppositely positioned of each other;
the message-displaying board being slidably engaged to the sign holder; and
the board locking mechanism being operatively coupled in between the sign holder and the message-displaying board, wherein the board locking mechanism secures the message-displaying board to the sign holder.

2. The trailer hitch mount display apparatus as claimed in claim 1 comprising:
the U-bracket further comprising a first lateral plate, a second lateral plate, a cross plate, a plurality of length-adjustable holes, and at least one pin-receiving opening;
the first lateral plate and the second lateral plate being positioned parallel to each other;
the cross plate being positioned in between the first lateral plate and the second lateral plate;
the first lateral plate being terminally connected to the cross plate;
the second lateral plate being terminally connected to the cross plate;
the plurality of length-adjustable holes traversing through the first lateral plate and the second lateral plate;
the at least one pin-receiving opening traversing through the first lateral plate and the second lateral plate; and
the at least one pin-receiving opening being positioned offset from the plurality of length-adjustable holes.

3. The trailer hitch mount display apparatus as claimed in claim 2 comprising:
the U-bracket further comprising a plurality of drain holes; and
the plurality of drain holes traversing through the cross plate.

4. The trailer hitch mount display apparatus as claimed in claim 2 comprising:
each of the plurality of length-adjustable holes being linearly distributed along the first lateral plate and the second lateral plate;
each of the plurality of length-adjustable holes being positioned about the fixed end; and
the at least one pin-receiving opening being positioned about the free end.

5. The trailer hitch mount display apparatus as claimed in claim 1 comprising:
the hitch pin comprising a pin body and a locking clip;
the U-bracket further comprising a first lateral plate, a second lateral plate, and a plurality of length-adjustable holes;
the pin body being slidably engaged within an arbitrary hole of the plurality of length-adjustable holes of the first lateral plate and a corresponding hole of the plurality of length-adjustable holes of the second lateral plate;
the locking clip being removably engaged to the pin body; and
the locking clip being externally positioned to the U-bracket.

6. The trailer hitch mount display apparatus as claimed in claim 1 comprising:
the sign holder comprising a back panel, a first connecting arm, a second connecting arm, and a plurality of height-adjustable holes;
the first connecting arm and the second connecting arm being positioned opposite of each other;
the first connecting arm and the second connecting arm being centrally connected to the back panel;
the plurality of height-adjustable holes traversing through the first connecting arm and the second connecting arm;
each of the plurality of height-adjustable holes being linearly distributed along the first connecting arm and the second connecting arm; and
the at least one ball locking pin being removably engaged within an arbitrary hole of the plurality of height-adjustable holes of the first connecting arm, at least one pin-receiving opening of the U-bracket, and a corresponding hole of the plurality of height-adjustable holes of the second connecting arm.

7. The trailer hitch mount display apparatus as claimed in claim 1 comprising:
the sign holder further comprising a back panel, a first lip, a second lip, and an intermediate lip;
the first lip, the second lip, and the intermediate lip being perimetrically connected around the back panel;
the first lip being diametrically opposed to the second lip; and
the intermediate lip being positioned in between the first lip and the second lip;
the message-displaying board being slidably engaged within the back panel, the first lip, the second lip, and the intermediate lip.

8. The trailer hitch mount display apparatus as claimed in claim 1 comprising:
the board locking mechanism comprising a first threaded opening, a second threaded opening, a first thumb screw, and a second thumb screw;
the sign holder comprising a back panel, a first connecting arm, and a second connecting arm;
the first threaded opening traversing through the back panel;
the first threaded opening being positioned offset from the first connecting arm;
the second threaded opening traversing through the back panel;
the second threaded opening being positioned offset from the second connecting arm;
the first thumb screw being threadedly engaged to the first threaded opening and a rear surface of the message-displaying board; and
the second thumb screw being threadedly engaged to the second threaded opening and the rear surface of the message-displaying board.

9. A trailer hitch mount display apparatus comprising:
a U-bracket;
a sign holder;
a hitch pin;
at least one ball locking pin;
a message-displaying board;
a board locking mechanism;
the U-bracket further comprising a first lateral plate, a second lateral plate, a cross plate, a plurality of length-adjustable holes, and at least one pin-receiving opening;
the first lateral plate and the second lateral plate being positioned parallel to each other;
the cross plate being positioned in between the first lateral plate and the second lateral plate;
the first lateral plate being terminally connected to the cross plate;
the second lateral plate being terminally connected to the cross plate;
the plurality of length-adjustable holes traversing through the first lateral plate and the second lateral plate;
the at least one pin-receiving opening traversing through the first lateral plate and the second lateral plate;
the at least one pin-receiving opening being positioned offset from the plurality of length-adjustable holes;
the hitch pin being selectively mounted to a fixed end of the U-bracket, wherein the hitch pin mounts the U-bracket to a vehicle;
the sign holder being adjustably mounted to a free end of the U-bracket through the at least one ball locking pin;
the message-displaying board and the U-bracket being oppositely positioned of each other;
the message-displaying board being slidably engaged to the sign holder; and
the board locking mechanism being operatively coupled in between the sign holder and the message-displaying board, wherein the board locking mechanism secures the message-displaying board to the sign holder.

10. The trailer hitch mount display apparatus as claimed in claim 9 comprising:
the U-bracket further comprising a plurality of drain holes; and
the plurality of drain holes traversing through the cross plate.

11. The trailer hitch mount display apparatus as claimed in claim 9 comprising:
each of the plurality of length-adjustable holes being linearly distributed along the first lateral plate and the second lateral plate;
each of the plurality of length-adjustable holes being positioned about the fixed end; and
the at least one pin-receiving opening being positioned about the free end.

12. The trailer hitch mount display apparatus as claimed in claim 9 comprising:
the hitch pin comprising a pin body and a locking clip;
the pin body being slidably engaged within an arbitrary hole of the plurality of length-adjustable holes of the first lateral plate and a corresponding hole of the plurality of length-adjustable holes of the second lateral plate;
the locking clip being removably engaged to the pin body; and
the locking clip being externally positioned to the U-bracket.

13. The trailer hitch mount display apparatus as claimed in claim 9 comprising:
the sign holder comprising a back panel, a first connecting arm, a second connecting arm, and a plurality of height-adjustable holes;
the first connecting arm and the second connecting arm being positioned opposite of each other;
the first connecting arm and the second connecting arm being centrally connected to the back panel;
the plurality of height-adjustable holes traversing through the first connecting arm and the second connecting arm;
each of the plurality of height-adjustable holes being linearly distributed along the first connecting arm and the second connecting arm; and
the at least one ball locking pin being removably engaged within an arbitrary hole of the plurality of height-adjustable holes of the first connecting arm, the at least one pin-receiving opening of the U-bracket, and a corresponding hole of the plurality of height-adjustable holes of the second connecting arm.

14. The trailer hitch mount display apparatus as claimed in claim 9 comprising:
the sign holder further comprising a back panel, a first lip, a second lip, and an intermediate lip;
the first lip, the second lip, and the intermediate lip being perimetrically connected around the back panel;
the first lip being diametrically opposed to the second lip; and
the intermediate lip being positioned in between the first lip and the second lip;
the message-displaying board being slidably engaged within the back panel, the first lip, the second lip, and the intermediate lip.

15. The trailer hitch mount display apparatus as claimed in claim 9 comprising:
the board locking mechanism comprising a first threaded opening, a second threaded opening, a first thumb screw, and a second thumb screw;
the sign holder comprising a back panel, a first connecting arm, and a second connecting arm;
the first threaded opening traversing through the back panel;
the first threaded opening being positioned offset from the first connecting arm;
the second threaded opening traversing through the back panel;
the second threaded opening being positioned offset from the second connecting arm;
the first thumb screw being threadedly engaged to the first threaded opening and a rear surface of the message-displaying board; and
the second thumb screw being threadedly engaged to the second threaded opening and the rear surface of the message-displaying board.

16. A trailer hitch mount display apparatus comprising:
a U-bracket;
a sign holder;
a hitch pin;
at least one ball locking pin;
a message-displaying board;
a board locking mechanism;
the U-bracket further comprising a first lateral plate, a second lateral plate, a cross plate, a plurality of length-adjustable holes, and at least one pin-receiving opening;
the sign holder comprising a back panel, a first connecting arm, a second connecting arm, and a plurality of height-adjustable holes;

the first lateral plate and the second lateral plate being positioned parallel to each other;

the cross plate being positioned in between the first lateral plate and the second lateral plate;

the first lateral plate being terminally connected to the cross plate;

the second lateral plate being terminally connected to the cross plate;

the plurality of length-adjustable holes traversing through the first lateral plate and the second lateral plate;

the at least one pin-receiving opening traversing through the first lateral plate and the second lateral plate;

the at least one pin-receiving opening being positioned offset from the plurality of length-adjustable holes;

the first connecting arm and the second connecting arm being positioned opposite of each other;

the first connecting arm and the second connecting arm being centrally connected to the back panel;

the plurality of height-adjustable holes traversing through the first connecting arm and the second connecting arm;

each of the plurality of height-adjustable holes being linearly distributed along the first connecting arm and the second connecting arm; and the hitch pin being selectively mounted to a fixed end of the U-bracket, wherein the hitch pin mounts the U-bracket to a vehicle;

the sign holder being adjustably mounted to a free end of the U-bracket through the at least one ball locking pin;

the at least one ball locking pin being removably engaged within an arbitrary hole of the plurality of height-adjustable holes of the first connecting arm, the at least one pin-receiving opening of the U-bracket, and a corresponding hole of the plurality of height-adjustable holes of the second connecting arm;

the message-displaying board and the U-bracket being oppositely positioned of each other;

the message-displaying board being slidably engaged to the sign holder; and the board locking mechanism being operatively coupled in between the sign holder and the message-displaying board, wherein the board locking mechanism secures the message-displaying board to the sign holder.

17. The trailer hitch mount display apparatus as claimed in claim 16 comprising:

the U-bracket further comprising a plurality of drain holes;

the plurality of drain holes traversing through the cross plate;

each of the plurality of length-adjustable holes being linearly distributed along the first lateral plate and the second lateral plate;

each of the plurality of length-adjustable holes being positioned about the fixed end; and the at least one pin-receiving opening being positioned about the free end.

18. The trailer hitch mount display apparatus as claimed in claim 16 comprising:

the hitch pin comprising a pin body and a locking clip;

the pin body being slidably engaged within an arbitrary hole of the plurality of length-adjustable holes of the first lateral plate and a corresponding hole of the plurality of length-adjustable holes of the second lateral plate;

the locking clip being removably engaged to the pin body; and the locking clip being externally positioned to the U-bracket.

19. The trailer hitch mount display apparatus as claimed in claim 16 comprising:

the sign holder further comprising a back panel, a first lip, a second lip, and an intermediate lip;

the first lip, the second lip, and the intermediate lip being perimetrically connected around the back panel;

the first lip being diametrically opposed to the second lip; and the intermediate lip being positioned in between the first lip and the second lip;

the message-displaying board being slidably engaged within the back panel, the first lip, the second lip, and the intermediate lip.

20. The trailer hitch mount display apparatus as claimed in claim 16 comprising:

the board locking mechanism comprising a first threaded opening, a second threaded opening, a first thumb screw, and a second thumb screw;

the sign holder comprising a back panel, a first connecting arm, and a second connecting arm;

the first threaded opening traversing through the back panel;

the first threaded opening being positioned offset from the first connecting arm;

the second threaded opening traversing through the back panel;

the second threaded opening being positioned offset from the second connecting arm;

the first thumb screw being threadedly engaged to the first threaded opening and a rear surface of the message-displaying board; and the second thumb screw being threadedly engaged to the second threaded opening and the rear surface of the message-displaying board.

* * * * *